United States Patent
Imade et al.

[11] Patent Number: 6,044,348
[45] Date of Patent: Mar. 28, 2000

[54] CODE RECORDING APPARATUS, FOR DISPLAYING INPUTTABLE TIME OF AUDIO INFORMATION

[75] Inventors: Shinichi Imade, Iruma; Yoshiyuki Nada, Hachioji, both of Japan

[73] Assignee: Olympus Optical Co., Ltd., Tokyo, Japan

[21] Appl. No.: 08/922,264

[22] Filed: Sep. 2, 1997

[30] Foreign Application Priority Data

Sep. 3, 1996 [JP] Japan ................................ 8-233070

[51] Int. Cl.[7] ........................................................ G10L 3/00
[52] U.S. Cl. .......................................... 704/278; 704/276
[58] Field of Search ...................................... 704/270, 278, 704/200, 258, 500, 201, 276, 214

[56] References Cited

U.S. PATENT DOCUMENTS

| | | | |
|---|---|---|---|
| 5,513,264 | 4/1996 | Wang et al. ............................... | 380/51 |
| 5,728,962 | 3/1998 | Goede ....................................... | 84/609 |
| 5,754,687 | 5/1998 | Fujimori et al. ......................... | 382/190 |
| 5,754,979 | 5/1998 | Lee et al. ................................. | 704/278 |
| 5,774,583 | 6/1998 | Sasaki et al. ............................ | 382/190 |
| 5,810,600 | 9/1998 | Okada ...................................... | 434/185 |
| 5,867,593 | 2/1999 | Fukuda et al. ........................... | 382/176 |
| 5,896,403 | 4/1999 | Nagasaki et al. ....................... | 371/37.1 |
| 5,898,709 | 4/1999 | Imade et al. ......................... | 371/40.11 |

FOREIGN PATENT DOCUMENTS 0 670 555 A1   9/1995   European Pat. Off. ......... G06K 1/12

*Primary Examiner*—Richemond Dorvil
*Attorney, Agent, or Firm*—Frishauf, Holtz, Goodman, Langer & Chick, P.C.

[57] ABSTRACT

A code recording apparatus code images voice data, records and prints the voice data, and prints and records the image data or text data on a recording sheet. A recording time arithmetic section calculates the inputtable time of the voice data, and displays the inputtable time in a recording time display section.

17 Claims, 15 Drawing Sheets

(SHEET AFTER IMAGE/TEXT PRINT LAYOUT)

(SHEET AFTER CODE RECORDING AREA INDICATION)

CODE RECORDING APPARATUS, FOR DISPLAYING INPUTTABLE TIME OF AUDIO INFORMATION

BACKGROUND OF THE INVENTION

The present invention relate to a code recording apparatus for printing and recording so-called multimedia information including voice information (audio information) such as voice or music, image information obtained from a camera or a video equipment and text data obtained from a personal computer or a word processor as an optically readable code pattern on a recording medium such as a sheet.

Hitherto, magnetic tapes or optical disks are known as media for recording audio information such as voice, or music. Even if a large quantity of duplicates are formed, the unit prices of these media become considerably expensive, and large places are required for their storage. Further, when it is necessary to deliver the media to a person or company in a remote district, much labor, time and/or expense arises. So-called multimedia, including image information obtained from a camera or a video equipment and text data obtained from a personal computer or a word processor, have similar problems.

As the means for coping with such problems, a system for recording and a system for reproducing multimedia information in the form of a dot code having a plurality of dots disposed in a two-dimensional manner as image information or coded information which can be transmitted by a facsimile and duplicated in a large quantity with a low cost on an information recording media such as sheets are disclosed in an EP 0,670,555 A1 (corresponding to U.S. Ser. No. 08/407,018).

FIG. 1 is a view showing dot code 10 disclosed in the EP 0,670,555 A1. In the pattern format of the dot code 10, one block 12 includes a marker 14, block addresses 16 and address error detection and error correction data 18, and a data area 22 entered with data dots 20 response to the actual data. The blocks 22 are arranged laterally and longitudinally in a two dimensional manner, and gathered to form the dot code 10.

It is disclosed in the EP 0,670,555 A1 that such a dot code 10 is read and reproduced by a pen type information reproducing apparatus. Furthermore, there is also disclosed a method for printing and outputting by a printer by using the pen type information reproducing apparatus as a scanner for characters and pictures and synthesizing the other information than code image such as the read characters and pictures and multimedia information which is code imaged.

However, in the recording system disclosed in the EP 0,670,555 A1, when the voices are intended to be code imaged and recorded, a user cannot know how long it will take to print and record.

BRIEF SUMMARY OF THE INVENTION

The present invention has been made to solve the above-described problems, and therefore, has an object to provide a code recording apparatus capable of easily identifying how long it will take to print and record when a user intends, for example, to code image a voice and records same by code imaging multimedia information.

According to a first aspect of the present invention, there is provided a code recording apparatus comprising:

input means for inputting multimedia information including at least audio information;

code generating means for converting the multimedia information inputted by the input means into optically readable code;

recording means for printing the code generated by the code generating means on a predetermined recording medium as an optically readable image;

arithmetic means for obtaining an inputtable time of the audio information to be inputted by the input means; and display means for displaying the time inputtable obtained by the arithmetic means in a predetermined form.

According to a second aspect of the present invention there is provided a code recording apparatus comprising:

input means for inputting multimedia information including at least audio information;

code generating means for converting the multimedia information inputted by the input means into optically readable code;

recording means for printing the code generated by the code generating means on a predetermined recording medium as an optically readable image;

time determining means for determining an inputtable time of the audio information to be input by the input means in accordance with a printable area of a recording medium of the code to be printed by the recording means; and display means for displaying the time inputtable determined by the time determining means in a predetermined form.

According to a third aspect of the present invention, there is provided a code recording apparatus comprising:

input means for inputting multimedia information including at least audio information;

code generating means for converting the multimedia information inputted by the input means into optically readable code; and recording means for printing the code generated by the code generating means on a predetermined recording medium as an optically readable image, and for printing other information including at least one of a document and an image except the code to meet the recording medium, wherein the inputtable time of the audio information to be coded inputted by the input means is substantially brought into coincidence with a printing time of the other information.

According to a fourth aspect of the present invention, there is provided a code recording apparatus comprising:

input means for inputting multimedia information including at least audio information;

code generating means for converting the multimedia information inputted by the input means into optically readable code;

recording means for printing the code generated by the code generating means on a predetermined recording medium as an optically readable image, and for printing other information including at least one of a document and an image except the code to meet the recording medium; and means for controlling a form of the other information to be printed on the recording medium in accordance with an area of a coding of the audio information input by the input means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

Embodiments of the present invention will be described below.

[First Embodiment]

Figure 1:
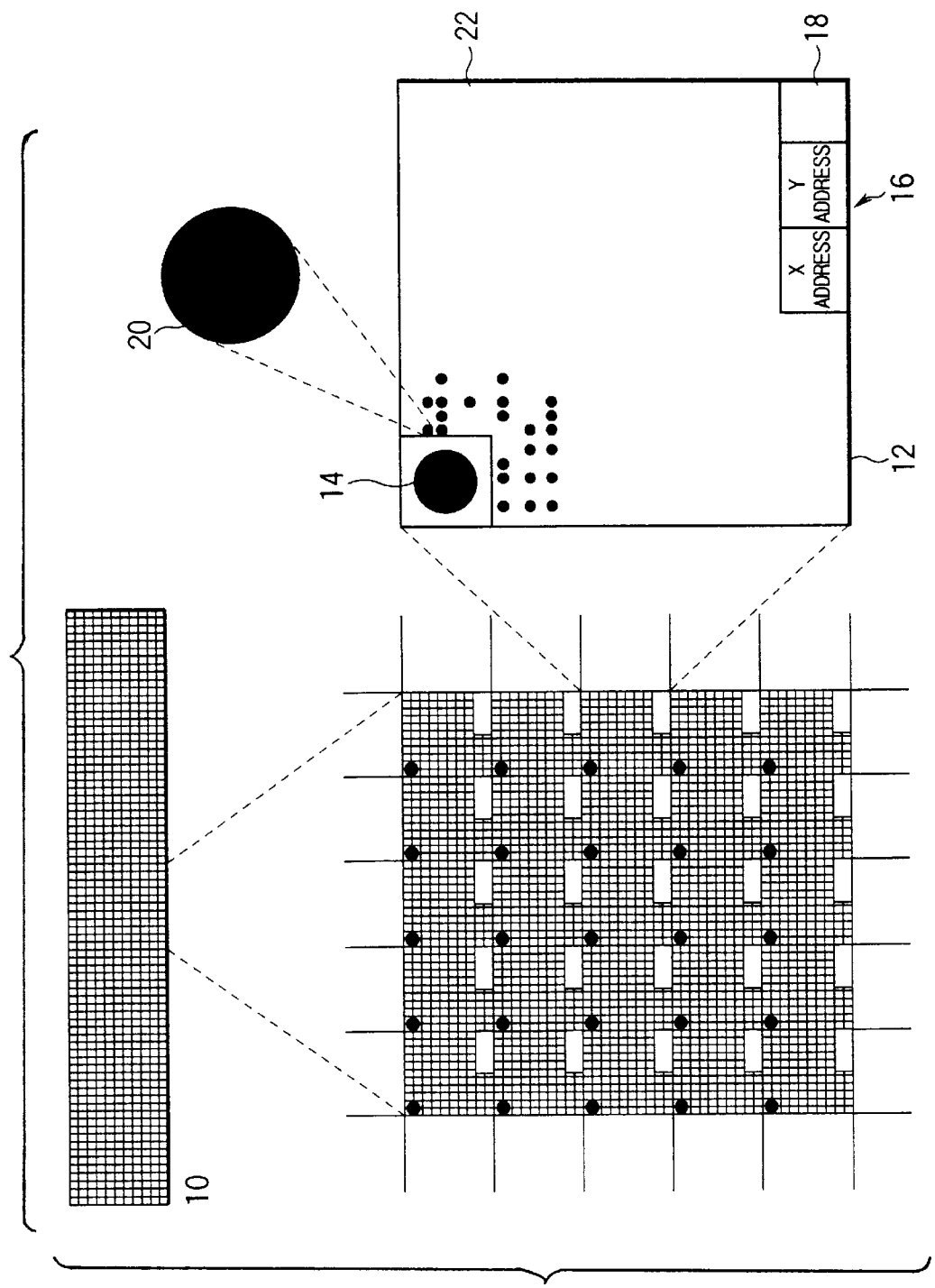
FIG. 1 is a view for showing a format of a dot code to be applied to the present invention.
Figure 2:
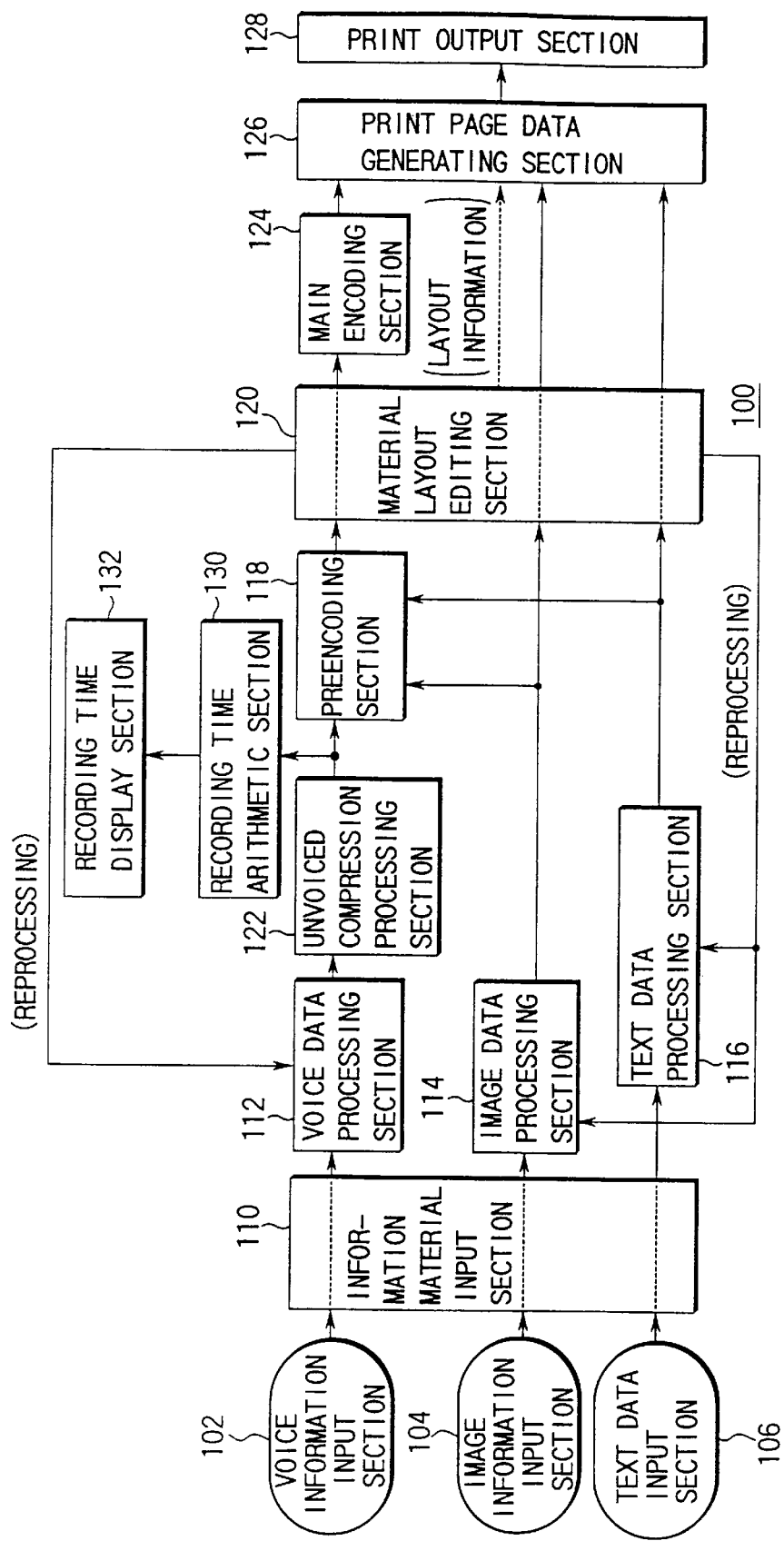
FIG. 2 is a block diagram for indicating a circuit arrangement of a code recording apparatus, according to a first embodiment of the present invention.
Figure 3:
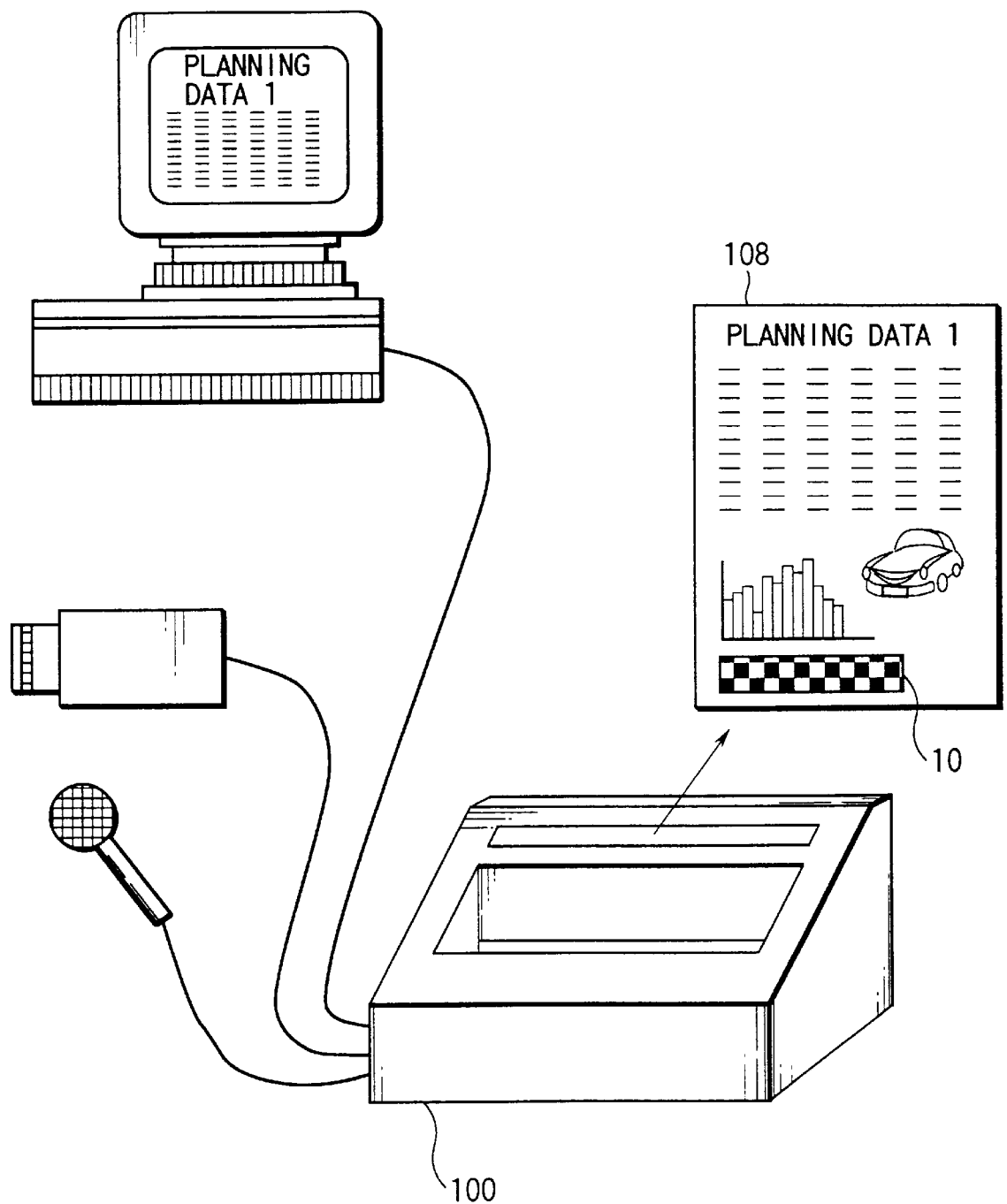
FIG. 3 is a view for indicating an outer appearance of the code recording apparatus of FIG. 2.

FIG. 2 is a block diagram for indicating a circuit arrangement of a code recording apparatus according to a first embodiment of the present invention, and FIG. 3 is a view for indicating an outer appearance thereof. To the code recording apparatus 100, a voice information input section 102 such as a microphone, an image information input section 104 such as a video camera (for inputting a dynamic image information) or a personal computer (for inputting a dynamic image and a still image) and a text data (digital code data) input section 106 such as a personal computer are connected. The multimedia information inputted from these respective input sections 102, 104 and 106 are recorded as a dot code on a print sheet together with sheet surface recording information including a text and a picture (image) from the personal computer of the information except the code to obtain a print output medium 108.

Specifically, the multimedia information from the respective input sections 102, 104 and 106 of the multimedia information are inputted to an information material input section 110, and, if required, converted into digital data by the information material input section 110.

The respective information converted to the digital data are input to corresponding processing sections such as a voice data processing section 112, an image data processing section 114 and a text data processing section 116. The voice data processing section 112 suitably processes by a user to edit the voice data such as to cut an unnecessary portion in the inputted voice data, to insert another voice data and to process such as a gain control and an equalizing process. The image data processing section 114 suitably processes by the user to edit the image data such as to trim, enlarge or contract the image, and to work such as to filter and to interpolate the image. The text data processing section 116 suitably processes by the user to edit the text data such as to regulate a font, to decorate a character, and to alter a size and to work it.

The image data and the text data of the data edited and processed by the respective processing sections as described above are inputted to a preencoding section 118 and a material layout editing section 120 as they are. That is, as the image data and the text date, there exist both the data coded and printed as dot code and the data printed directly as the image and the text. The former is supplied to the preencoding section 118 and the latter is supplied to the material layout editing section 120.

The voice data is input to an unvoiced compression processing section 122. The voiced portion and the unvoiced portion of the voice data inputted as described above are discriminated by the unvoiced compression processing section 122. The unvoiced data portion is compressed, and the resultant data is supplied as the unvoiced compression data to the preencoding section 118.

In the case of coding the data of the respective media, it always needs to process to compress the data. However, the data compression process is very heavy in the processing load and takes much time. Therefore, the preencoding section 118 does not actually process to compress the data, but processes to obtain only the final size of the code image. Namely, the preencoding section 118 can obtain the data size after the compression based on the compression ratio of the data of the respective media set by the user and to immediately obtain the size of the degree in printing when the data to be compressed is converted to the dot code according to the error correction level similarly set by the user and the data format of the dot code specified in advance.

The data of the size in printing obtained by the preencoding section 118 is input to the material layout editing section 120. The data to be actually printed except the code image such as the image and the text data are supplied to the material layout editing section 120 as described above. The user determines, for example, the allocating layout of the data except the code image and the precode image formed of, for example, only a profile frame based on the size data of the code image. When desired layout cannot be obtained from the supplied respective data due to the reason that the size of the data of the respective media are, for example, large or small, the respective data are returned from the material layout editing section 120 to the respective data processing sections 112, 114 and 116, and can be reprocessed.

When both the desired allocations are conducted, the coded data is inputted to a main encoding section 124, and the actual coding process is executed by using the parameter such as the compression ratio and the error correction level of the preencoding section 118. Since the coding process is disclosed in EP 0,670,555 A1 the description thereof will be omitted.

The code image pattern generated from the main encoding section 124 is supplied together with the layout information from the material layout editing section 120 and the other data to be actually printed except the code image to a print page data generating section 126, and developed as page data (image data) to be printed. The developed page data is printed by a print output section 128.

In this embodiment described as above, the recording time of the voiced data, i.e., the data actually coded and printed in a recording time arithmetic section 130 is calculated on the basis of the determination result of the voiced/unvoiced portion in the above-described unvoiced compression processing section 122 as to the voiced data. The calculated recording time or the residual time for indicating how long the following recording can be allowed is displayed on a recording time display section 132. In this manner, when the user actually prints the voice as recording, i.e., dot code, the user can be informed of how long time the voice can be inputted.

Figure 4:
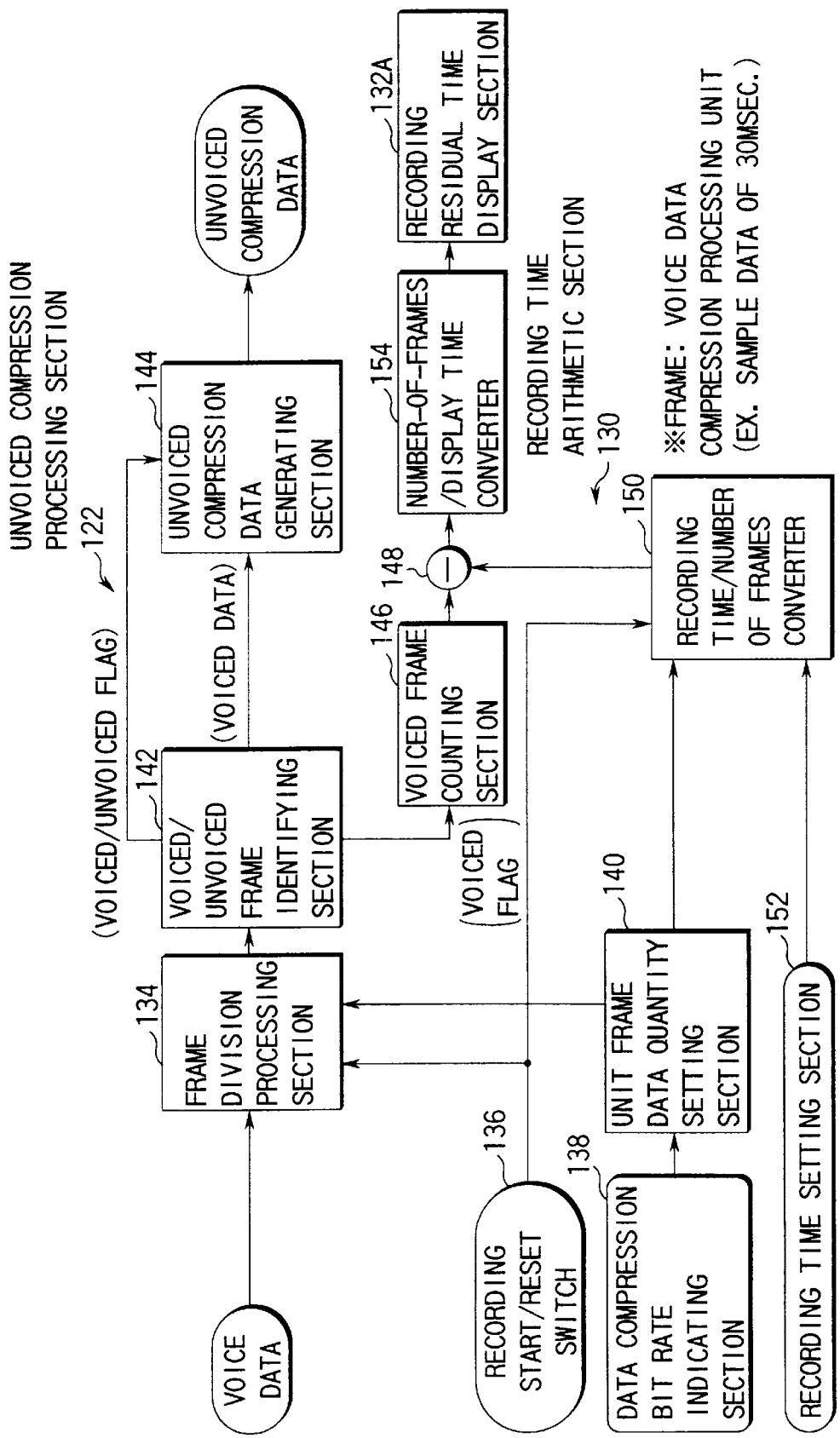
FIG. 4 is a view for indicating a circuit arrangement of an unvoiced compression processing section and a recording time arithmetic section in FIG. 2.

FIG. 4 is a view for indicating the details of the portions of the unvoiced compression processing section 122, the recording time arithmetic section 130 and the recording time display section 132. FIG. 4 shows the case that a recording residual time display section 132A for displaying the residual recording time is used as the recording time display section 132.

Specifically, the voice data from the voice data processing section 112 is supplied to a frame division processing section 134. To the frame division processing section 134, a start/reset signal responsive to the operation of a recording start/reset switch 136 and a unit frame data quantity set by a unit frame data quantity setting section 140 on the basis of the data compression rate designated by the user's operation of a data compression bit rate indicating section 138 are further inputted.

The frame means the maximum compression processing unit at the time of compressing the voice data, and 30 msec or 40 msec is generally used. In this embodiment described above, sample data for 30 msec is, for example, one frame.

The data compression bit rate indicating section 138 can select, for example, a plurality of data compression bit rates such as 6.4 kbps or 4 kbps. The selected data compression bit rate is inputted to a unit frame data quantity setting section 140. The unit frame data quantity setting section 140 obtains how many byte data is obtained in one frame from the information for forming the frame by 30 msec and the data compression bit rate, and is given to a frame division processing section 134.

Figure 5:
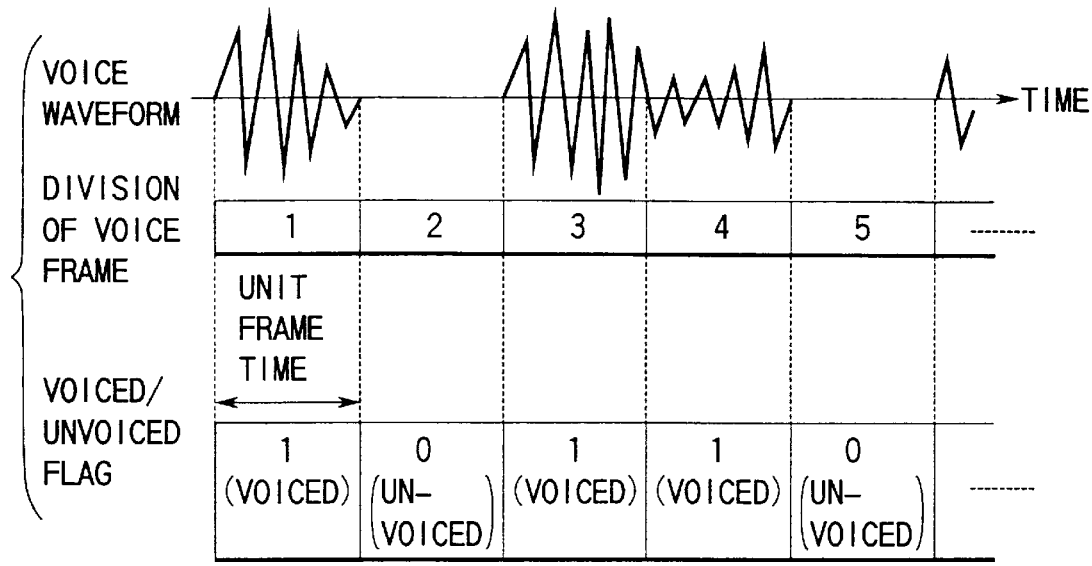
FIG. 5 is a view for indicating the relationship between a voice waveform, a voice frame and voiced/unvoiced flag.

When a recording start is designated by the recording start/reset signal responsive to the operation of the recording start/reset switch 136 in the frame division processing section 134, the voice data to be inputted continuously from the voice data processing section 112 is divided at a frame unit as shown in FIG. 5. It is noted that there is another case that voice is continuously inputted from the voice information input section 102 real time to the fame division processing section 134, and similarly divided at a frame unit.

Figure 6:
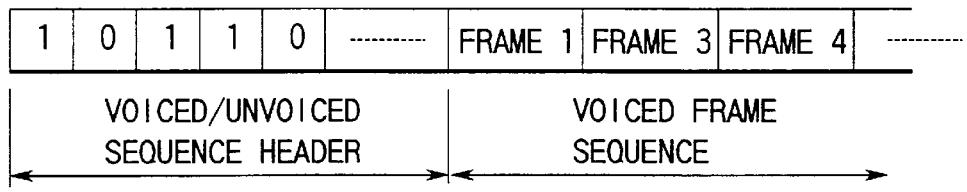
FIG. 6 is a view for indicating a configuration of unvoiced compression data.

A data row of the frame unit outputted from the frame division processing section 134 is inputted to an unvoiced/voiced frame identifying section 142. The unvoiced/voiced frame identifying section 142 recognizes whether the input frame is voiced or unvoiced. The voiced frame means the portion having an amplitude in the voice waveform indicated at the uppermost portion of FIG. 5, i.e., the portion having the voiced frame, and the unvoiced frame indicates the portion having no voice. The voiced/unvoiced frame identifying section 142 stands a voiced/unvoiced flag as shown at the lowermost portion of FIG. 5 in response to the identified result, supplies the voiced/unvoiced flag to an unvoiced compression data generating section 144, and similarly supplies the data row of the frame identified as the voiced to the unvoiced compression data generating section 144. The unvoiced compression data generating section 144 couples the data row of the supplied voiced frame as shown in FIG. 6, adds a header to understand what order of the frame is voiced or unvoiced to generate unvoiced compression data and outputs the unvoiced compression data to the preencoding section 118.

Each time when the voiced frame is identified by the voiced/unvoiced frame identifying section 142 and a voiced flag is stood, the number of times is counted by a voiced frame counting section 146. The counted result is supplied to a subtracter 148. A recording time/number-of-frames converter 150 converts the recording time of the voice of only the voiced frame set by the user by a recording time setting section 152 into the number of frames on the basis of the data how many data byte the one frame unit set by the unit frame data quantity setting section 140 becomes. The converted number of frames is given to the subtracter 148. The subtracter 148 calculates the difference between the number of frames of the voiced portion counted by the voiced frame counting section 146 and the number of voiced frame corresponding to the set recording time converted by the recording time/number-of-frames converter 150, thereby making it possible to obtain the residual number of the recordable voiced frames.

Figures 7, 8:
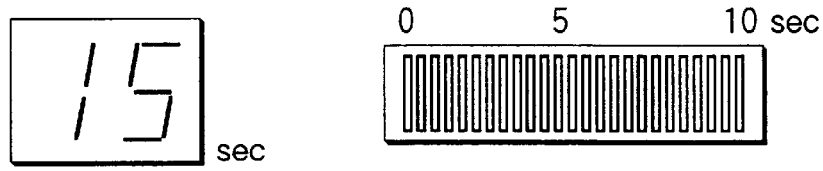
FIGS. 7 to 9 are views for indicating display examples of a recording residual time display section in FIG. 4.
Figure 9:
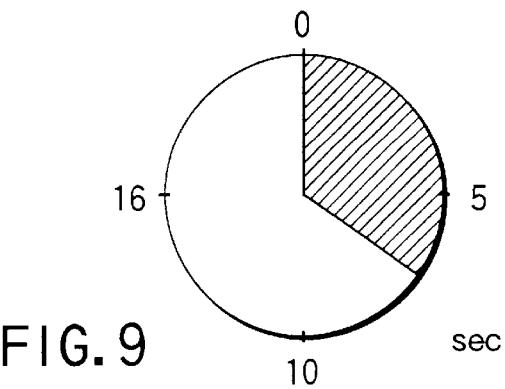

The output of the subtracter 148 is converted into the residual recording time by a number-of-frames/display time converter 154, and the residual recording time is displayed, as shown, for example, in FIG. 7, as a numeric value on the recording residual time display section 132A. Or, as the recording residual time display section 132A, a display capable of representing the state of gradually reducing the recording time as shown in FIG. 8 or a display capable of representing the residual quantity by a circular graph as shown in FIG. 9 may be employed. In addition, various embodiments such as a display of gradually accelerating a flashing speed as the recording residual time is decreased by using, for example, one LED may be considered.

As described above, the generation of unvoiced compression data, namely, the display of recording and recording residual time are conducted until the recording start/reset switch 136 is operated and a reset command is given by a start/reset signal to the frame division processing section 134 and the recording time/number-of-frames converter 150. Of course, when the difference of the set number of the voiced frames outputted from the recording time/number-of-frames converter 150 and the number of the voiced frames outputted from the voiced frame counting section 146 becomes zero, the generation of the unvoiced compression data is ended.

Figure 10:
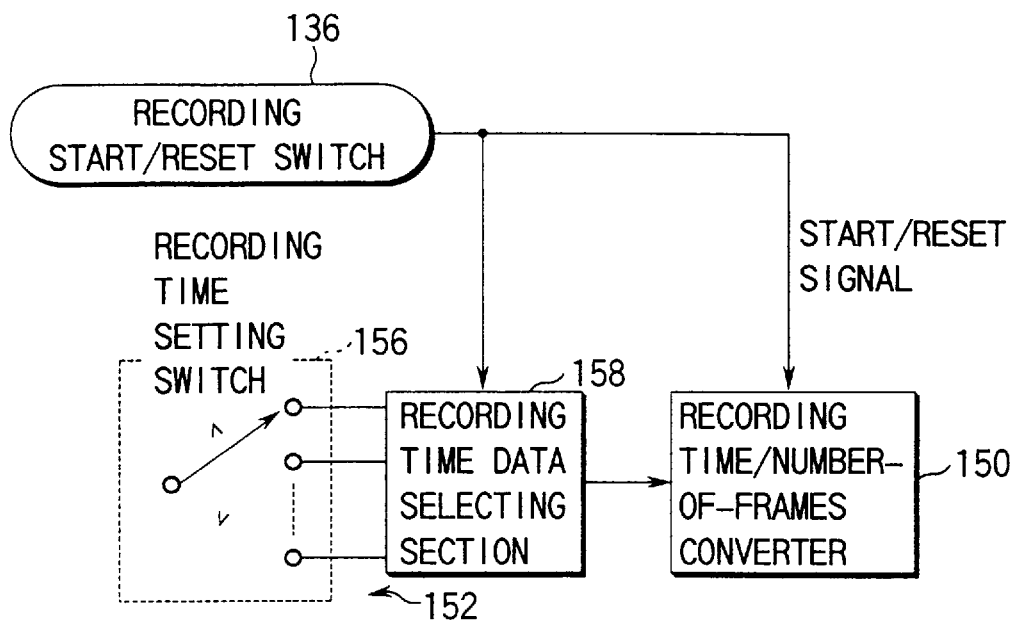
FIG. 10 and FIG. 11 are views for indicating circuit arrangements of a recording time setting section in FIG. 4.

FIG. 10 is a view for indicating an arrangement example of the recording time setting section 152. The recording time setting section 152 has a recording time setting switch 156, a recording time data selecting section 158. The recording time setting switch 156 is a switch for selecting a plurality of predetermined recording times by a mechanical switch. The recording time data selecting section 158 is controlled in the operation by the start/reset signal of the recording start/reset switch 136, and selectively outputs the recording time data responsive to the selecting operation of the recording time switch 156 to the recording time/number-of-frames converter 150.

Figure 11:
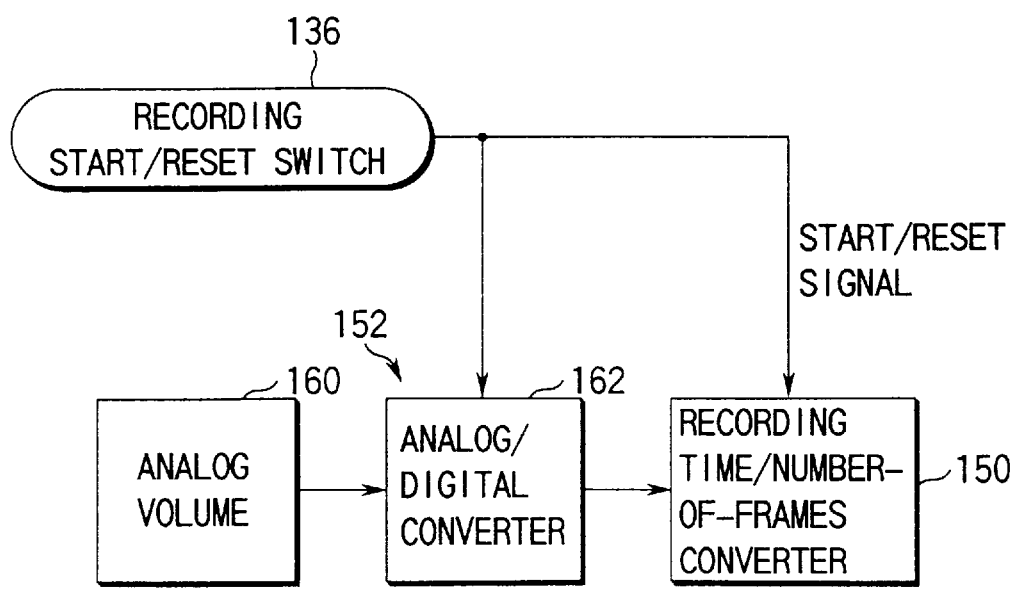

FIG. 11 is a view for indicating another arrangement example of the recording time setting section 152. The recording time setting section 152 of this case has an analog volume 160, and an analog/digital converter 152. The analog volume 160 is not a discrete switch selection as shown in FIG. 10 but can set continuously. The analog/digital converter 162 is controlled in the operation by the start/reset signal of the recording start/reset switch 136, converts the analog voltage value responsive to the operating quantity of the analog volume 160 into digital data, and outputs it to the recording time/number-of-frames converter 150.

In the first embodiment as described above, the inputtable time of voice (audio) information to be inputted is obtained, and the obtained time is displayed in a predetermined form. Therefore, when the user intends to record the voice of desired content by the user within a limited recording time, the user can easily regulate the time of the inputting voice while confirming the recordable time. In this manner, the recording voice is not discontinued on the way of recording, and the failure of the recording is reduced. Hence the operating load of the user of retrying the recording can be alleviated, and the wasteful consumption of the recording medium such as the recording sheets can be prevented.

[Second Embodiment]

Then, a second embodiment of the present invention will be described.

The code recording apparatus of this second embodiment prints other data than a code image such as normal image or text on a preformed sheet predetermined in the size such as a postcard, and prints a code image obtained by coding voice. Particularly, the code recording apparatus of this second embodiment detects the residual portion, namely a blank portion on the sheet after the layout of the data except the code image is determined, and displays the inputtable time of the voice responsive to the area.

Figure 12:
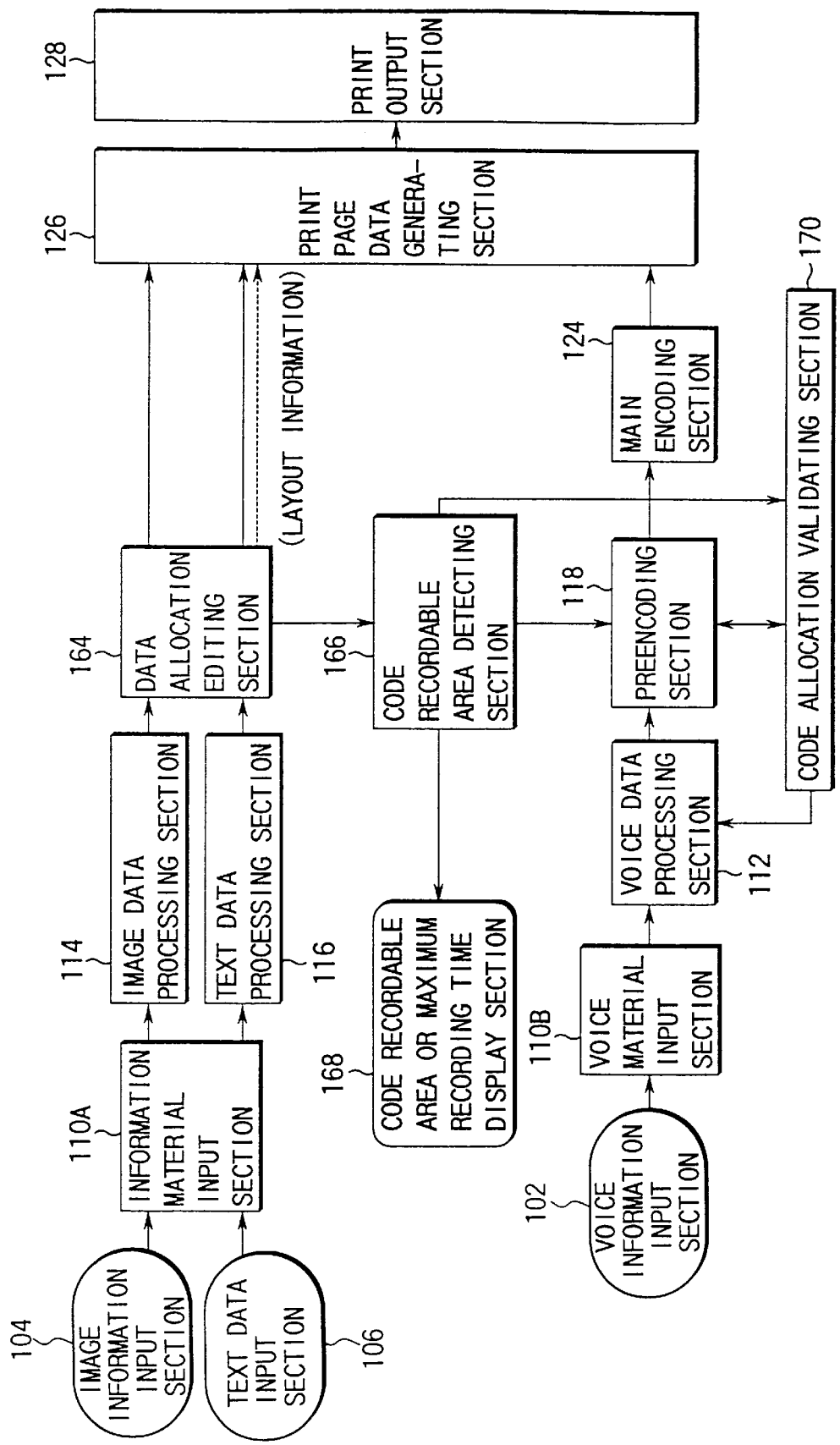
FIG. 12 is a block diagram for indicating a circuit arrangement of a code recording apparatus, according to a second embodiment of the present invention.

FIG. 12 is a view for indicating an arrangement of the second embodiment of the code recording apparatus, wherein the same reference numerals as those in the first embodiment designate the similar reference numerals to those in FIG. 2.

The data inputted from an image information input section 104 and a text data input section 106 are, if required, converted into digital data by an information material input section 110A. The image data and the text data converted into the digital data are supplied to corresponding image data processing section 114 and text data processing section 116, processed to be edited as described above, and then inputted to a data allocation editing section 164.

The data allocation editing section 164 determines the layout of the print sheet of the data except the code image inputted as described above, and supplies the data except the code image together with the layout information to a print page data generating section 126. The data allocation editing section 164 supplies the information of how the data except the code image is allocated to a code recordable area detecting section 166.

The code recordable area detecting section 166 detects the print recordable blank area of the code image on the print sheet on the basis of the supplied information, and displays the detected result in a code recordable area or maximum recording time display section 168. More specifically, the code recordable area detecting section 166 indicates where the information is coded and recorded on the sheet, and informs the maximum recording time of the case of recording on the area to the user. It is noted that the display of the maximum recording time in the code recordable area or maximum recording time display section 168 displays only the aim but does not display the severe maximum recording time.

The code recordable area detecting section 166 supplies the blank area detected result to a preencoding section 118 and also to a code allocation validating section 170.

To the preencoding section 118, the voice data inputted from a voice information input section 102 is converted into digital data by a voice material input section 110B, and processed to be edited as described above by a voice data processing section 112, and given. The preencoding section 118 calculates how code size the voice data becomes. The information of the obtained code size is supplied to the code allocation validating section 170.

The code allocation validating section 170 validates whether the code image obtained by coding the voice data falls within the blank area or not on the basis of the blank area detected result from the code recordable area detecting section 166 and the information of the code size from the preencoding section 118. If the code image does not fall within the blank area, the voice data processing section 112 designates to reprocess the voice data.

If it is validated that the code image coded as described above falls within the code recordable blank area, the voice data is supplied to a main encoding section 124, actual coding process is executed, and a code image pattern is generated. The code image pattern is supplied to the print page data generating section 126, developed as page data (image data) to be printed according to layout information together with the data actually printed except the code image from the data allocation editing section 164, given to a print output section 128, and printed on the sheet.

Figure 13:
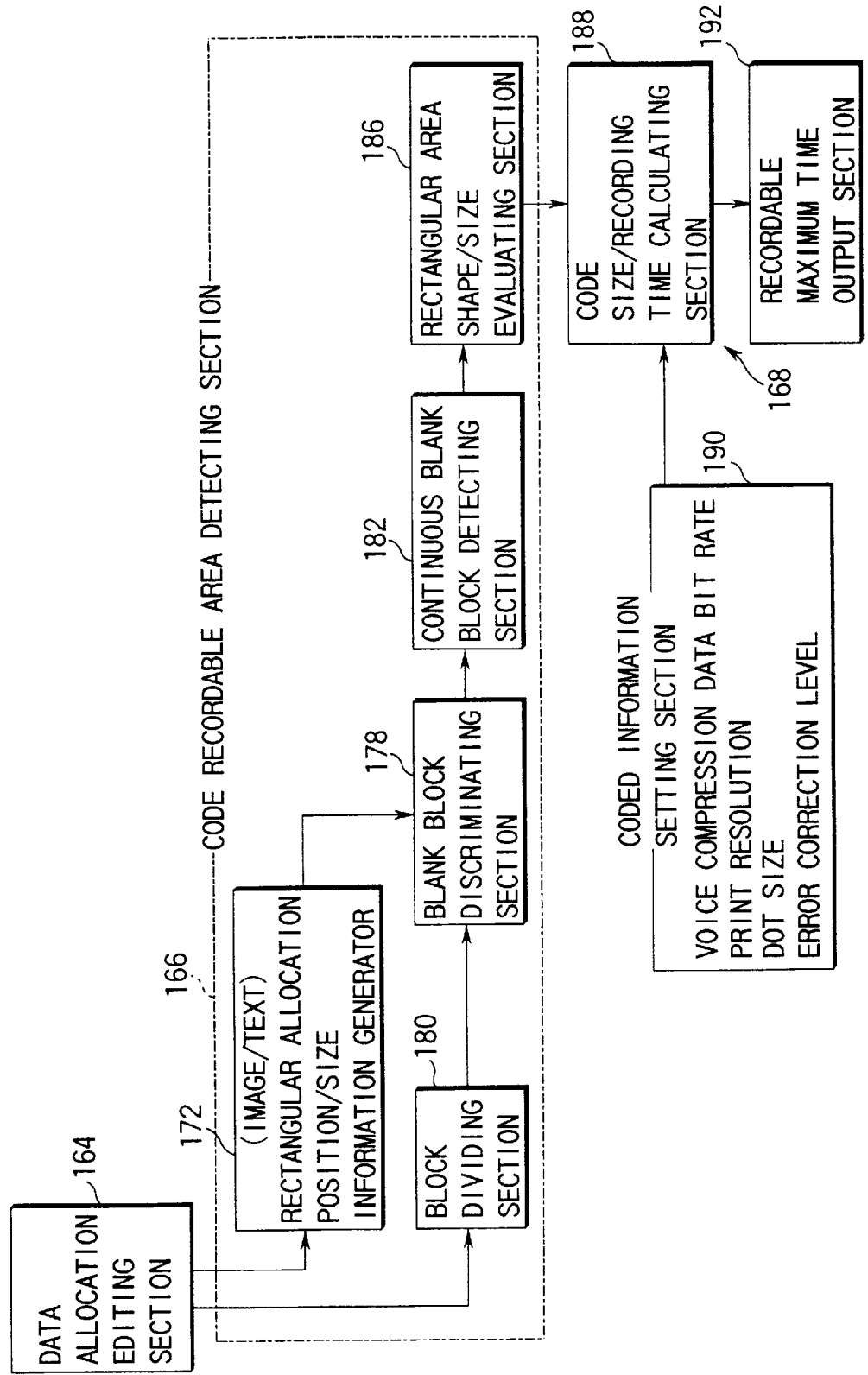
FIG. 13 is a view for indicating a circuit arrangement of a code recordable area detecting section and a code recordable area or maximum recording time display section in FIG. 12.

FIG. 13 is a view for indicating a concrete arrangement example of the code recordable area detecting section 166. This example is of the case of detecting the code recordable area on the basis of the layout information of how the data except the code image is allocated.

Figure 14:
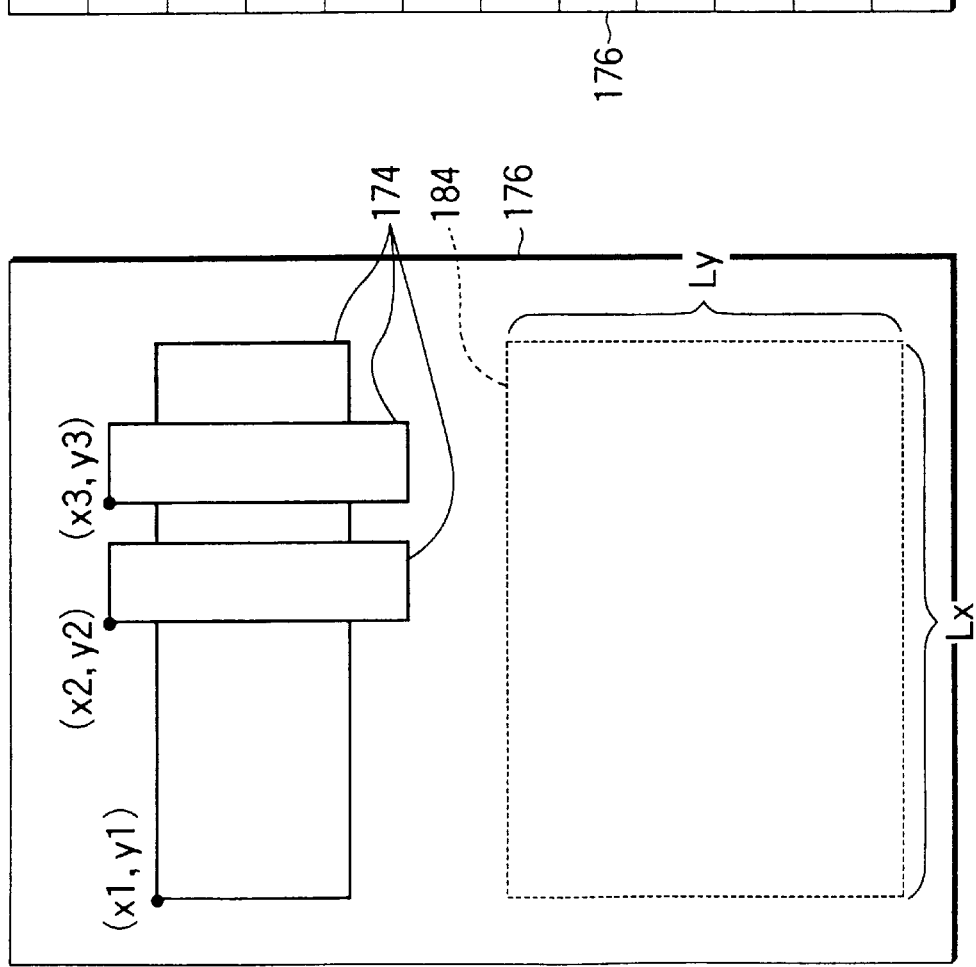

More specifically, the layout information to be output from the data allocation editing section 164 is inputted to a rectangular allocation position/size information generating section 172. The rectangular allocation position/size information generating section 172 generates, as shown, for example, in FIG. 14, the sizes (size information) in lateral and longitudinal directions of coordinate values (position information) of a point at the upper left corner of each rectangle when the image or text is allocated to the rectangular area 174 of a sheet surface 176. These rectangular allocation position information and size information are supplied to a blank block discriminating section 178.

Figure 15:
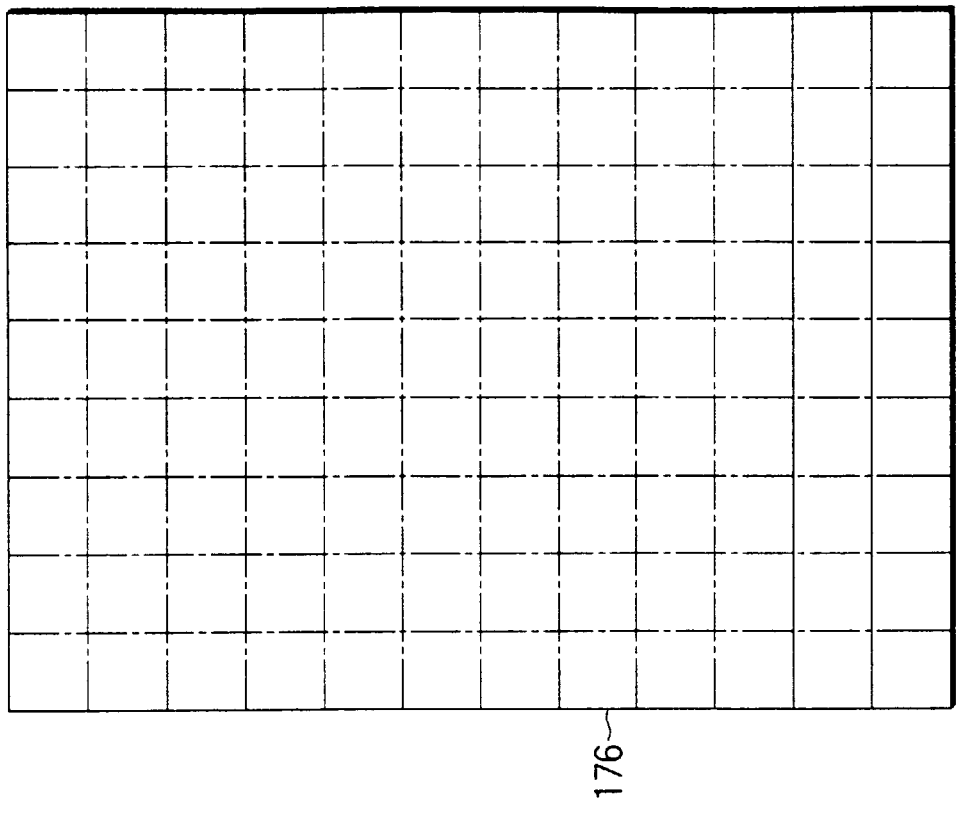
FIGS. 14 and 15 are views for indicating form sheet surfaces for explaining the operations of a rectangular area allocation position/size information generating section and a block dividing section in FIG. 13.

On the other hand, the layout information outputted from the data allocation editing section 164 is further inputted to a block dividing section 180. The block dividing section 180 divides, as indicated by one-dotted chain line in FIG. 15, the sheet surface 176 into blocks cut in lateral and longitudinal matrix state, and divided information is supplied to the blank block discriminating section 178.

The blank block discriminating section 178 judges at a block unit whether there is an image or a text in the corresponding block or not, and discriminates whether it is the blank block or not. The discriminated result is supplied to a continuous blank block detecting section 182, which detects the area where the blank blocks continuously exist, i.e., continuous blank blocks 184 indicated by broken lines in FIG. 14. The detected information of the continuous blank blocks 184 are given to a rectangular area shape/size evaluating section 186, which evaluates whether the shape and size of the rectangular area formed of the continuous blank blocks are valid or not to print and record a code image. In this case, the rectangular area shape/size evaluating section 186 judges whether certain thresholds thx, thy or more when the lateral and longitudinal sizes of the continuous blank blocks 184 are displayed by Ly and Lx, thereby making it possible to evaluate whether the code image is valid or not to record.

The size information of the rectangular area evaluated as being valid to record the code image, i.e., the code recordable area by the rectangular area shape/size evaluating section 186 is supplied to a code recordable area or maximum recording time display section 168. The code recordable area or maximum recording time display section 168 has a code size/recording time calculating section 188, a coded information setting section 190 and a recordable maximum time output section 192.

The size information is inputted to the code size/recording time calculating section 188. To the code size/recording time calculating section 188, parameter information necessary to code such as, for example, voiced compression data bit rate, printing resolution, dot size, error correction level are given from the coded information setting section 190. The parameter information may be set by the user or predetermined. The code size/recording time calculating section 188 calculates how long recording time corresponds to the size of the code recordable area indicated by the size information according to the parameter information.

The calculated result, i.e., the recordable maximum time is displayed and outputted by the recordable maximum time output section 192.

Figure 16:
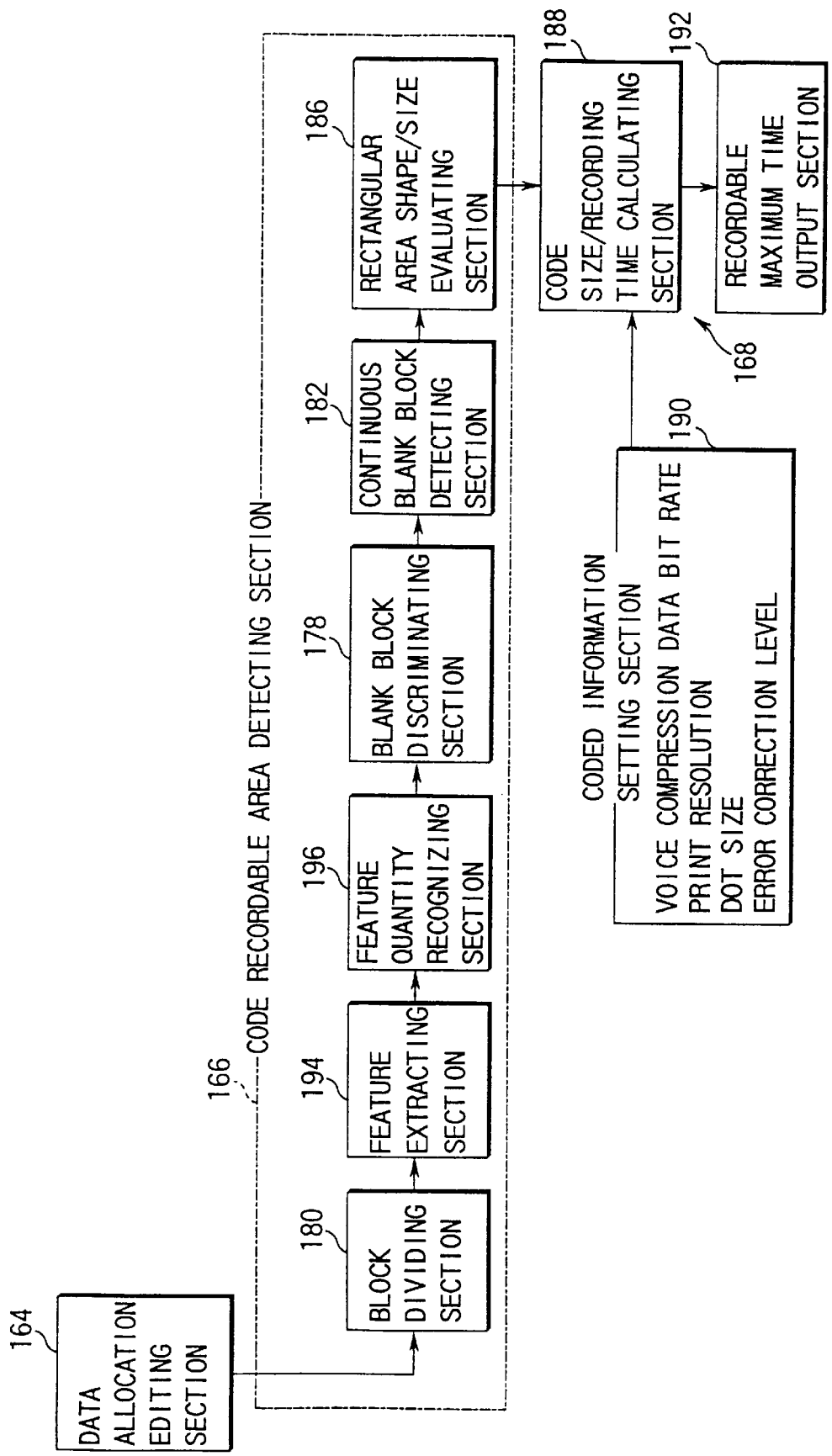
FIG. 16 is a view for indicating other circuit arrangement of a code recordable area detecting section and a code recordable area or maximum recording time display section in FIG. 12.

FIG. 16 is a view for indicating other arrangement example of the code recordable area detecting section 166. This example is the case of not detecting the code recordable area on the basis of the above-described layout information but detecting the code recordable area on the basis of the image or text actually allocated.

Specifically, the actual data allocated to the data allocation editing section 164 is supplied to the block dividing section 180, and inputted at each block unit to a feature extracting section 194. The feature extracting section 194 calculates, for example, a luminance histogram from block image data. The extracted feature is inputted to a feature quantity recognizing section 196 to recognize the feature quantity. For instance, in the case of the luminance histogram, the shape of the histogram is recognized.

The result recognized in the feature quantity recognizing section 196 is supplied to the blank block discriminating section 178, and whether it is the blank block or not is discriminated at a block unit. For example, in the luminance histogram, the shape becomes sharp in the blank portion, and the certain portion of the image becomes a widened distribution, and hence whether it is the blank block or not can be judged.

The arrangement after the blank block discriminating section 178 is similar to that of the example described with reference to FIG. 13, and therefore the description thereof will be omitted.

In the second embodiment described above, the voice (audio) inputtable time is determined in response to the printable area in the code recording medium, and the determined time is displayed in a predetermined form. Accordingly, the recording time can be regulated by considering the print size of the code. Therefore, the failures that the code cannot be printed on the desired recording area after the recording, and the layout balance of other original to be printed coexistence on the printed surface such as, for example, a photographic image or text image is not satisfied can be reduced, the operating load of the user by retrying from the recording can be alleviated, and the wasteful consumption of the recording medium such as recording sheets can be prevented.

[Third Embodiment]

Then, a third embodiment of the present invention will be described.

In this third embodiment, a code recordable area is set by a user.

Figure 17:
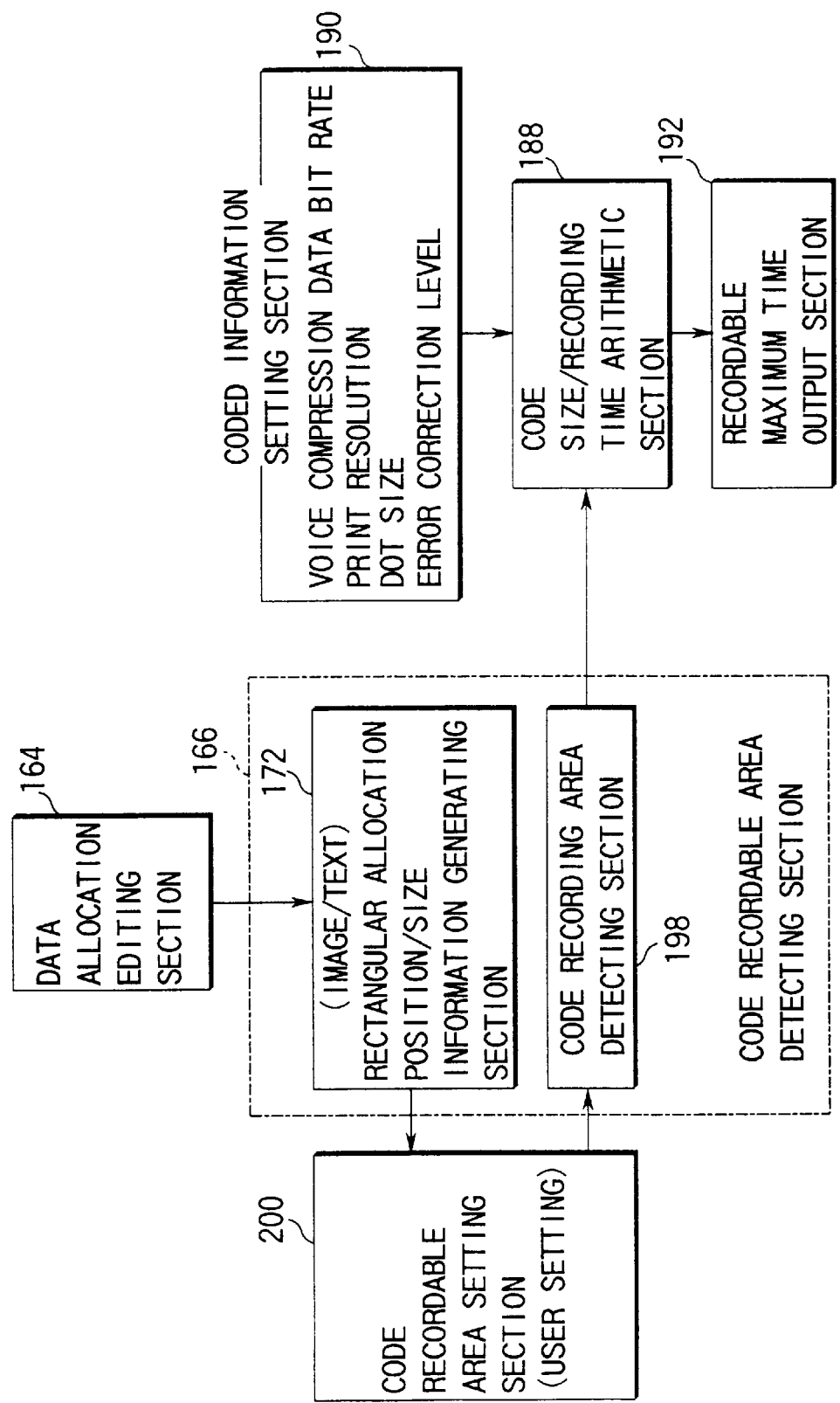
FIG. 17 is a view for indicating still another circuit arrangement example of the code recordable area detecting section and code recordable area or maximum recording time display section in FIG. 12.

FIG. 17 is a view for indicating an arrangement of the code recordable area detecting section 166 in this third embodiment. In this third embodiment, the code recordable area detecting section 166 has a rectangular allocation position/size information generating section 172 and a code recordable area detecting section 198. Furthermore, a code recordable area setting section 200 for setting by user is provided.

The layout information outputted from the data allocation editing section 164 is inputted to the rectangular allocation position/size information generating section 172, which generates the position information and size information of the rectangular area.

The position and size information are supplied to the code recordable area setting section 200, and code recordable rectangular areas are displayed, for example, on a display. When the user selectively designates the desired code recordable area by operating, for example, a mouse, the selection information is inputted to the code recordable area detecting section 198, and the code recordable area selected by the user is detected. The size information of the detected code recordable area is transmitted to the code size/recording time calculating section 188.

Figure 18:
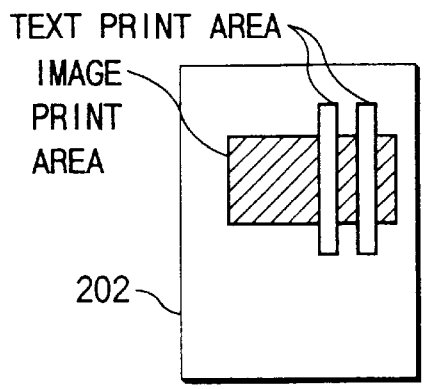
FIGS. 18 to 21 are views for indicating print sheets for explaining the operation of a code recording apparatus, according to a third embodiment of the present invention.
Figure 19:
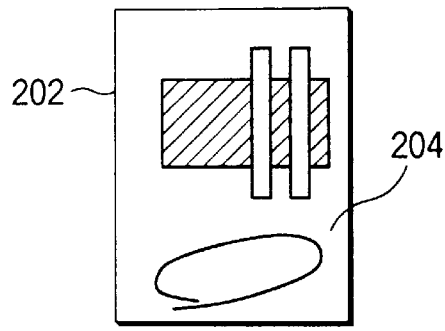
Figure 20:
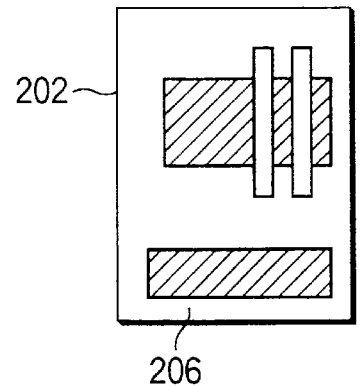
Figure 21:
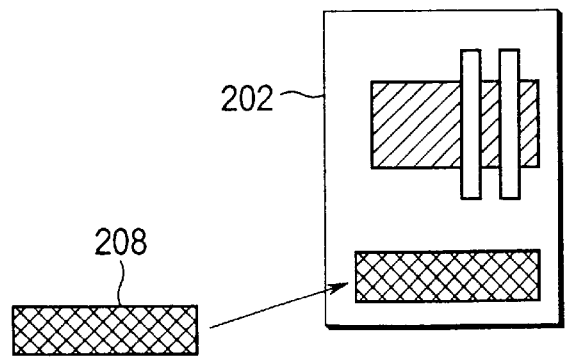

As the above-described recordable area setting section 200, in addition to the display and the mouse, it can be realized by a combination of a printer and a scanner. For example, the image or text picture layout as shown in FIG. 18 is printed and outputted to a print sheet 202, and the user writes, as shown in FIG. 19, a mark 204 for indicating the designated area by handwriting. Then, the area designating sheet is optically read to detect the code recording area by the code recording area detecting section 198, and as shown in FIG. 20, the corresponding position is used as a code paste area 206, and the code image is recorded. Or, a code paste area indicating label 208 is stuck, as shown in FIG. 21, on the print sheet 202 printed and recorded with the layout as shown in FIG. 18, and the area indicating sheet may be optically read to detect the code recording area by the code recording area detecting section 198.

In the third embodiment as described above, the user designates the code image recordable area, and the voice (audio) information inputtable time is determined on the basis of the designated area. Therefore, the user can simply allocate the code to the intended position and area on the print surface, and the complicated code layout may be simply operate in a short time.

[Fourth Embodiment]

A fourth embodiment of the present invention will be described.

This fourth embodiment is the case of preferentially allocating the image by the print data except a code image.

Figure 22:
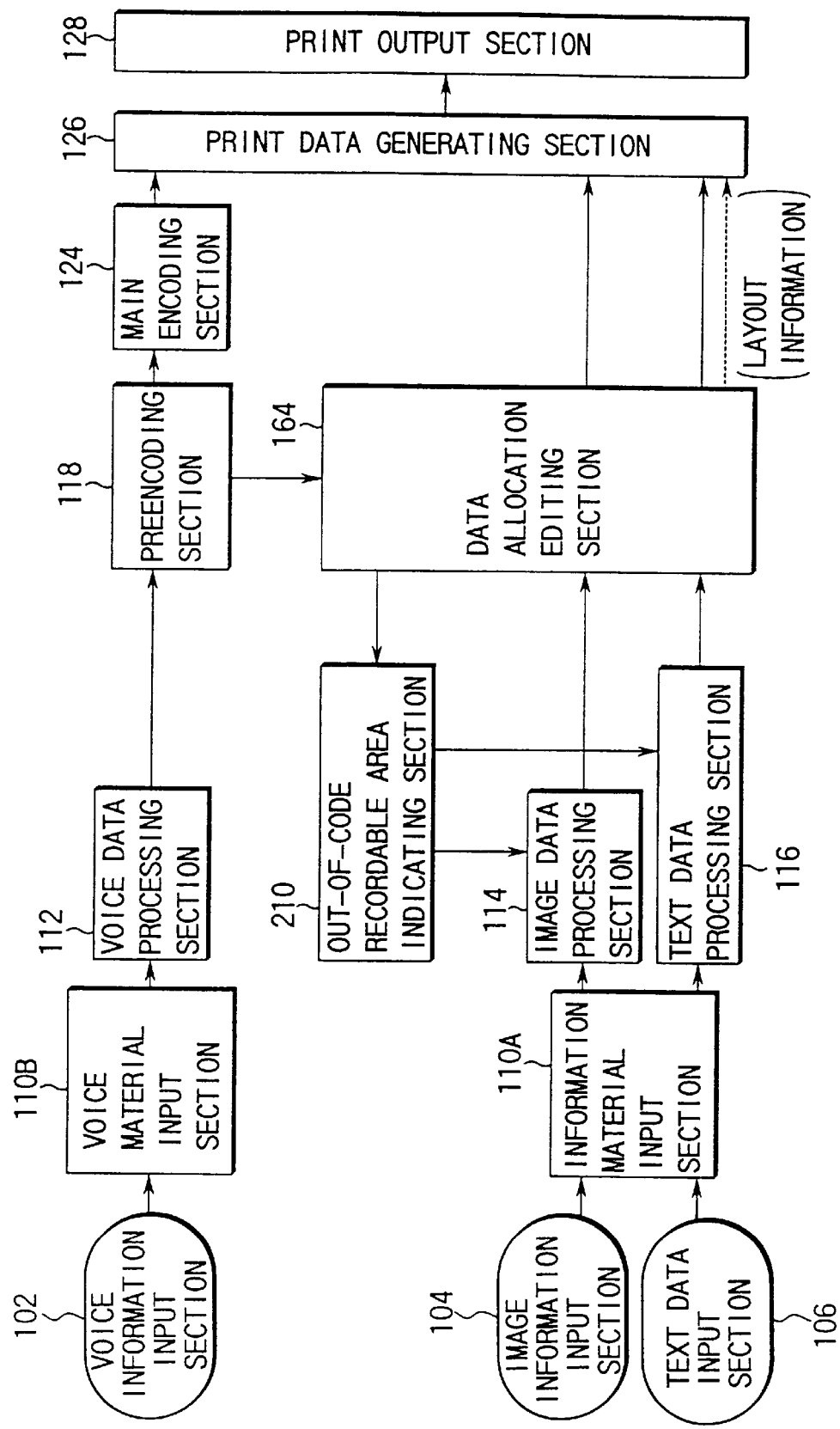
FIG. 22 is a block diagram for indicating a circuit arrangement of a code recording apparatus, according to a fourth embodiment of the present invention.

FIG. 22 is a view for indicating an arrangement of the fourth embodiment, wherein the reference numerals similar to those in the second embodiment designate the similar reference numerals to those in FIG. 12.

More specifically, voice data processed to be edited by a voice data processing section 112 is supplied to a preencoding section 118, and a code size is calculated. The information of the code size is inputted to the data allocation editing section 164.

The data allocation editing section 164 allocates the code image on a print sheet on the basis of the information of the inputted code size, and supplies the information of the layout of the code to an out-of-code recordable area indicating section 210. The out-of-code recordable area indicating section 210 determines the out-of-code recordable area which can record data except the code image such as image and text on the basis of the information of the layout of the supplied code, and informs the information of the out-of-code recordable area to the user by a display (not shown).

On the other hand, the image data and text data are supplied to an image data processing section 114 and a text data processing section 116 as described above, and processed to be edited. In this case, the user processes to edit the size to fall within the out-of-code recordable area designated by the out-of-code recordable area indicating section 210, i.e., a blank.

The image data and the text data processed to be edited as described above are inputted to the data allocation editing section 164, and allocated together with the code.

When the allocation is finished, voice data is supplied to a main encoding section 124 and the actual coding process is executed, thereby generating a code image pattern. The code image pattern is supplied to a print page data generating section 126, developed as page data (image data) for printing according to the layout information together with the data to be actually printed except the code image from the data allocation editing section 164, given to the print output section 128 and printed on the sheet.

In the fourth embodiment as described above, the disposition form of the information except the code to be printed on the recording medium is altered and controlled in response to the area of the case of coding the voice (audio) information, and the print layout of the coexisting out-of-code information by considering the code size of the voice data. Therefore, the layout edition, which can be satisfied by the printed matter manufacturer, can be performed, and the manufacturer can provide a completed product for a third party.

[Fifth Embodiment]

Then, a fifth embodiment of the present invention will be described.

This fifth embodiment has an arrangement of substantially bringing the inputtable time of voice data to be coded into coincidence with the printing time of other information except the code on a recording sheet in the case of preferentially allocating the information except the code of the image and text.

Figure 23:
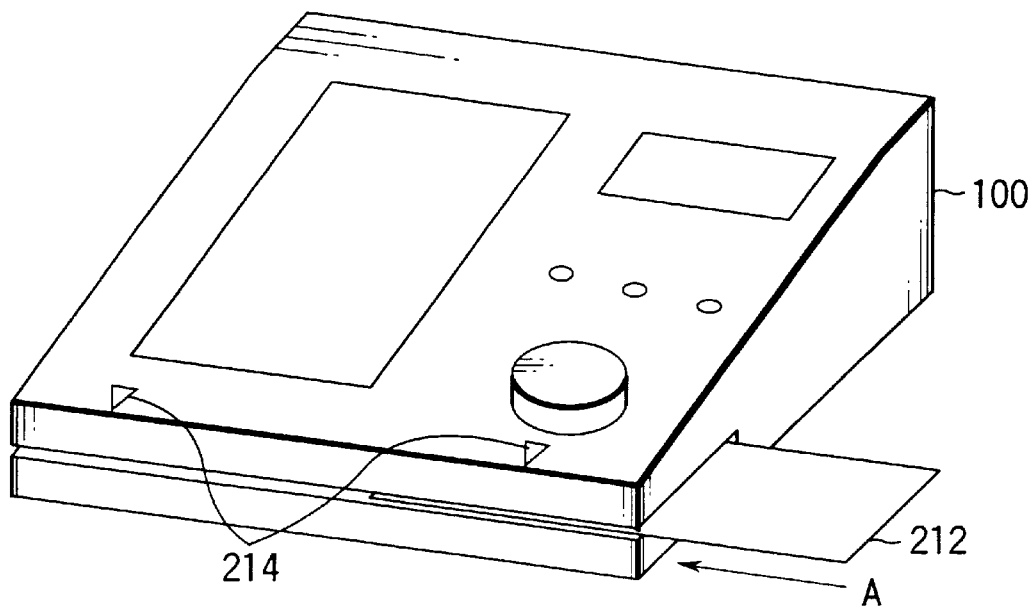
FIGS. 23 and 24 are views for indicating an outer appearance example of a code recording apparatus, according to a fifth embodiment of the present invention.

In this case, as shown in FIG. 23, a sheet feeding mechanism in which the proceeding state at the time of printing information except a code for a recording sheet 212 can be visually recognized is provided. Thus, the recording time of the voice can be informed to the user. In this case, the recording sheet 212 is to be conveyed in the direction of an arrow A in FIG. 23, the recordable period is indicated while the head of the arrow A is disposed between two inverted triangular marks 214.

Figure 24:
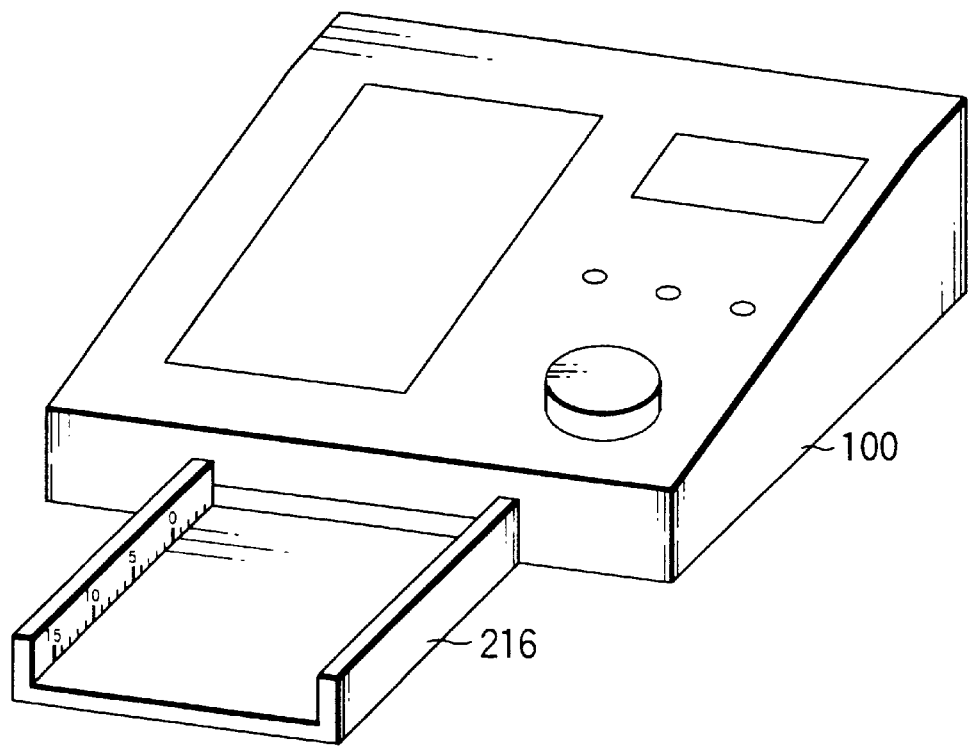

Or, as shown in FIG. 24, an arrangement that a scale is marked on the sheet feed tray 216 of recording sheets and as the recording sheet is retracted, the rear end position indicates the residual recordable time may be adopted.

Figure 25:
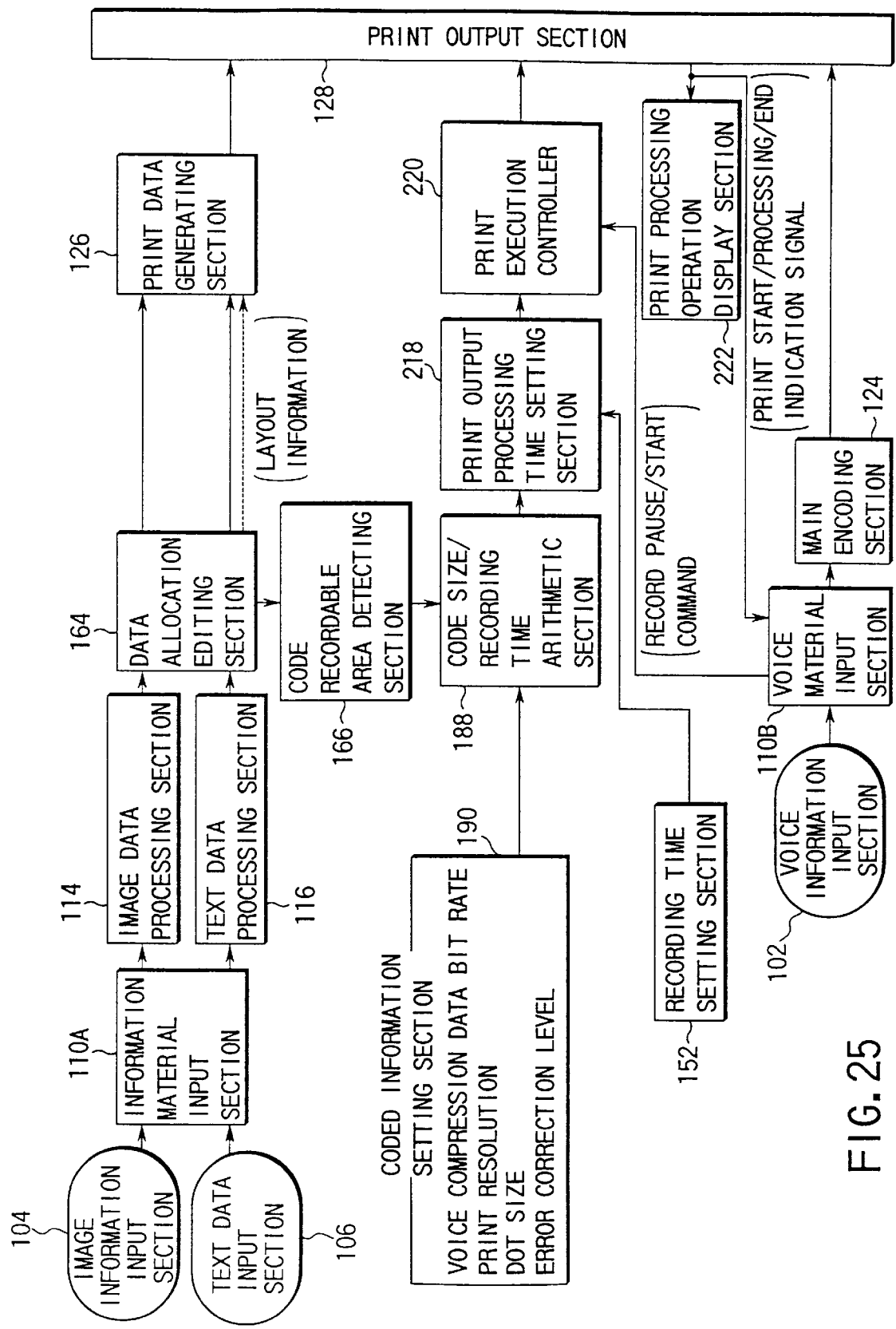
FIG. 25 is a block diagram for indicating a code recording apparatus, according to the fifth embodiment of the present invention.

FIG. 25 is a view for indicating an arrangement of this fifth embodiment, where reference numerals as those of the second embodiment designate similar reference numerals to those in FIG. 12.

More specifically, the image data and text data processed to be edited as described above area are allocated by a data allocation editing section 164, the layout information relative to the allocation is inputted to a code recordable area detecting section 166, and a code recordable area is detected. The size information of the code recordable area is supplied to a code size/recording time calculating section 188, and converted into a voice recordable time by using various parameter information to be set by a coded information setting section 190.

The calculated voice recordable time is supplied to a print output processing setting section 218, and displayed onto the print output processing setting section 218. The user sets how long it is to be recorded within the recordable time by a recording time setting section 152 by observing the display. The set information is inputted to the print output processing time setting section 218. The print output processing time setting section 218 determines the time for processing to print the inputted recording time, and gives it to a print execution controller 220.

The print execution controller 220 controls a print output section 128 to process to print to meet the supplied print processing time. That is, if the print processing time is long, it is controlled to slowly print to take a long time printing process. On the contrary, if the print processing time is short, it is controlled to rapidly print to finish the printing process in a short time.

At this time, the print output section 128 drives a print processing operation display section 222 upon processing to print, and displays the actually printing state. Namely, with the configurations known in FIG. 23 and FIG. 24, the printing state is displayed in the state that the print sheet is feeding. Of course, it can be indicated by flashing of any indicator such as an LED.

The print output section 128 supplies print start, processing and end indication signals to a voice material input section 110B. This is provided to set to a recording state simultaneously upon the start of printing process and to refuse the input of voice data upon ending of the printing process since the printing output operation is used as a reference.

The voice material input section 110B digitizes the voice data inputted from the voice information input section 102 and supplies it to a main encoding section 124, converts it into a code image pattern by the main encoding section 124, and prints and records it by the print output section 128.

At this time, when the user temporarily desires to record, a pause switch (not shown) is operated to give a record pause/start command from a voice material input section 110B to the print execution controller 220 in response to the temporary stop designating operation, and the temporary stop control of the print process can be conducted.

In the foregoing description, the recording of the data except the code image and the recording of the code image data are conducted real time. However, it is noted that the voice data inputted upon printing of the data except the code image on the print sheet is temporarily stored in a memory, the voice data temporarily stored after the print is finished is coded, the print sheet printed with the data except the code image is again set and the code image data may be printed and recorded thereon.

In this fifth embodiment as described above, the inputtable time of the voice (audio) information to be coded is constituted so as to be substantially brought into contact with the printing time of other information except the code for the recording medium. Accordingly, the other information except the code is printed on the printing medium, and the sequential validation of the voice time to be inputted and coded and recording can be simultaneously conducted while validating it. Therefore, the suitable regulating of the recording time and the regulation to be visually easily recognized can be performed and the processing time required for the process of the recording and printing can be efficiently shortened, thereby alleviating the operator's load and enhancing the operating efficiency.

The present invention has been described on the basis of the embodiments described above. However, the present invention is not limited to the above-described embodiments, but various modifications and applications may be applied within the scope of the present invention. For example, in the foregoing description, the voice data is code imaged and the data except the code image is recorded as it is. However, the image data and the text data are suitably code imaged and recorded. The ratio of the voice data may, of course, be regulated to display the recordable time.

The scope of the present invention is summarized as follows:

(1) A code recording apparatus comprising:
input means (102, 104, 106) for inputting multimedia information including at least audio information;
code generating means (124, 126) for converting the multimedia information inputted by the input means into optically readable code; and
recording means (128) for printing the code generated by the code generating means on a predetermined recording medium as optically readable image, characterized by further comprising:
arithmetic means (122, 130) for obtaining an inputtable time of audio information to be inputted by the input means; and
display means (132) for displaying the time obtained by the arithmetic means in a predetermined form.

More specifically, when the user intends to print and record the voice of the desired content within a limited recording time, the user can easily regulate the time of the voice to be input while validating the recordable time. In this manner, the failure of discontinuing the recording voice on the way of recording to lose the recording is reduced, the user's operating load of retrying the recording can be alleviated and the waste consumption of the recording medium such as a recording sheet can be prevented.

(2) The code recording apparatus according to (1), characterized by further comprising:
time setting means (152) for previously setting input time of audio information, and characterized in that
the arithmetic means (122, 130) subtracts the actual input time of audio information inputted to the apparatus from the time set by the time setting means (152) to obtain the inputtable time of the audio information.

More specifically, the user can record in a plan by considering the balance between the code size having the input time and attribute and the voice content desired to be recorded by setting the input time. Furthermore, at the time of recording, the residue of the recordable time can be sequentially monitored and hence the conscious time regulation can be performed, and the failure of recording can be more reduced.

(3) The code recording apparatus according to (2), characterized in that
the time setting means (152) comprises means (156, 158) for setting a predetermined time fixed in the apparatus.

Specifically, since the selection of setting time is limited, the selection of the recording time is facilitated.

(4) The code recording apparatus according to (2), characterized in that
the time setting means (152) comprises means (160, 162) for variably setting the setting time.

Specifically, since the degree of freedoms of selecting the content and time of the user's desired input voice can be increased, the restriction in the content and time of the input voice is alleviated, and hence the user's intended recording can be realized.

(5) The code recording apparatus according to (2), characterized in that
the arithmetic means (122, 130) comprises identifying means (142) for identifying the voiced portion and the unvoiced portion from the audio data inputted by the input means, and
when the real input time of the audio information inputted to the apparatus is subtracted from the time set by the time setting means (152) to obtain the inputtable time of the audio information, the unvoiced portion identified by the identifying means (142) is removed from the audio data to obtain the corresponding time.

Specifically, when unvoiced portion removing process effective to delete the data quantity is conducted, the recording time can be variably set according to the way of the presence of the unvoiced portion of the input voice even if the data quantity is converted. However, since the actually recordable residual time can be sequentially validated by providing the function, the user can intentionally regulate the input voice. Accordingly, failure of recording can be reduced.

(6) The code recording apparatus according to (5), characterized in that
the arithmetic means (122, 130) further comprises dividing process means (134) for dividing audio data corresponding to the audio information input by the input means at a predetermined unit, and
the removal of the unvoiced portion identified by the identifying means (142) is conducted by the dividing process means (134) at a dividing unit.

Specifically, since the voice data compression is generally handled by dividing the input audio data by dividing at a predetermined unit, if the unvoiced portion removing process as a preprocessing is processed at the same dividing unit, it is not necessary to conduct the data conversion for voice data compression process, and the handling of the data for the voice data compression process from the unvoiced portion removing process to the data is smoothly conducted.

(7) A code recording apparatus comprising:
  input means (102, 104, 106) for inputting multimedia information including at least audio information;
  code generating means (124, 126) for converting the multimedia information inputted by the input means into optically readable code; and
  recording means (128) for printing the code generated by the code generating means on a predetermined recording medium as optically readable image, characterized by further comprising:
  time determining means (166, 168) for determining inputtable time of audio information to be input by the input means in response to the printable area of a recording medium of the code to be printed by the recording means; and
  display means (192) for displaying the time determined by the time determining means (166, 168) in a predetermined form.

More specifically, since the recording time can be regulated by considering the print size of the code, the failure of no printing of the code on the desired recording area after recording and no satisfaction of the layout balance with other original to be printed in coexistence on the printing surface such as a photographic image or character image can be alleviated, and the waste consumption of the recording medium such as the printing sheet can be prevented.

(8) The code recording apparatus according to (7), characterized in that
  the time determining means (166, 168) comprises area detecting means (166) for detecting the printable area of the code in the recording medium, and
  the inputtable time of the audio information is determined on the basis of the result detected by the area detecting means (166).

Specifically, since the inputtable time of the audio information by the code recordable area can be known before the recording, the estimate of the input voice time can be performed. The selection of the voice material and the selection of the input voice content by considering the input voice time are suitably conducted. Accordingly, the failure of recording is alleviated to plan suitable printing surface.

(9) The code recording apparatus according to (8), characterized in that
  the recording means (166) comprises means (172, 178, 180, 182, 186, 178, 180, 182, 186, 194, 196) for detecting the printable area of the code in the recording medium to print other information including at least one of document and image except the code on the recording medium.

Specifically, since the inputtable estimate time of the audio information can be understand before recording after the layout of the print original except the code is preferentially provided, the selection of the voice material and the selection of the input voice content by considering the input voice time are suitably conducted. Accordingly, the failure of recording is alleviated to make it possible to plan suitable printing surface.

(10) The code recording apparatus according to (7), characterized in that
  the time determining means (166, 168) comprises area indicating means (200) for previously indicating the printable area by an operator, and
  the inputtable time of the audio information is determined on the basis of the area indicated by the area indicating means (200).

Specifically, since the code can be allocated to the position and area simply intended by the user on the printing surface, complicated code layout can be conducted in a simple short time operation.

(11) The code recording apparatus according to (10), characterized in that
  the area indicating means (200) comprises printable area indicating sheet reading means for reading the printable area indicating sheet (202) having mark (204, 206, 208) for indicating the printable position of the code on the recording medium, and
  the printable area is indicated from the mark (204, 206, 208) read by the printable area designating sheet reading means.

Specifically, since the position for allocating the code on the printing surface can be indicated by only the simple operation for reading the area indicating sheet, a complicated code layout can be conducted in a simple short time operation.

(12) A code recording apparatus comprising:
  input means (102, 104, 106) for inputting multimedia information including at least audio information;
  code generating means (124, 126) for converting the multimedia information inputted by the input means into optically readable code; and
  recording means (128) for printing the code generated by the code generating means on a predetermined recording medium as optically readable image and printing other information including at least one of document and image except the code to meet the recording medium, characterized in that
  the inputtable time of the audio information to be coded inputted by the input means is substantially brought into coincidence with the printing time of the other information.

Specifically, since the other information than the code is printed on the printing medium and sequential validation of the voice time to be inputted and coded while validating the state and the recording can be simultaneously conducted, the suitable regulation of the recording time and the regulation to be visually easily recognized can be performed, the processing time required for the recording and printing process can be efficiently shortened, and the operator's load can be alleviated to enhance the operating efficiency.

(13) The code recording apparatus according to (12), characterized by further comprising:
  means (214, 216, 222) for enabling to visually recognize the proceeding state of the other information at the time of printing.

Specifically, the suitable regulation of the recording time and the regulation for visually easily recognizing it can be conducted, and voice input of high accuracy can be performed.

(14) The code recording apparatus according to (12), characterized by further comprising:
  means (110B, 220) for starting to input audio information to be input by the input means on the basis of the print starting operation of the other information.

Specifically, the timing of starting the recording is visually easily recognized and the failure of idling the space initially in recording data or unintentional recording result due to the early start is finished can be prevented. Accordingly, preferable recording can be performed.

(15) The code recording apparatus according to (12), characterized by further comprising:
  time determining means (164, 166, 188, 190, 218) for determining the inputtable time of audio information to be input by the input means in response to the printable area in the recording medium of the code printed by the recording means; and means (220) for controlling the printing speed of the other information in response to the time determined by the time determining means (164, 166, 188, 190, 218).

Specifically, the user does not intentionally need to lay out and estimate the printing position and size of the code by the user by himself and calculate the recordable time but can understand the recordable time, the user can easily regulate time of the input voice. Since the visually recording state can be easily recognized while executing the print of information except the code, the operation of high time efficiency of medium printing and recording can be conducted, and hence the failure of recording can be reduced.

(16) The code recording apparatus according to (15), characterized by further comprising:

time setting means (152) for previously setting input time of audio information, and characterized in that the time determining means (164, 166, 188, 190, 218) determines the inputtable time of the audio information by considering the time set by the time setting means (152).

More specifically, since the time regulation of the input voice at a predetermined recording time is visually easily recognized while executing the writing of information except the code, the operation of high time efficiency of medium printing and recording can be performed, and the failure of recording can be reduced.

(17) A code recording apparatus comprising:

input means (102, 104, 106) for inputting multimedia information including at least audio information;

code generating means (124, 126) for converting the multimedia information inputted by the input means into optically readable code; and recording means (128) for printing the code generated by the code generating means on a predetermined recording medium as optically readable image and printing other information including at least one of document and image except the code to meet the recording medium, characterized by further comprising:

means (164, 210) for controlling to alter the disposing form of the other information to be printed on the recording medium in response to the area of the case of coding the audio information input by the input means.

Specifically, since the print layout of the information except the coexistent code can be altered by considering the code size of voice data, the layout editing which can be satisfied by a printed matter manufacturer can be performed, and the completion by the manufacturer can be provided for a third party.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

We claim:

1. A code recording apparatus comprising:

input means for inputting multimedia information including at least audio information;

code generating means for converting the multimedia information inputted by said input means into optically readable code;

recording means for printing the code generated by said code generating means on a predetermined recording medium as an optically readable image;

arithmetic means for obtaining an inputtable time of the audio information to be inputted by said input means; and display means for displaying the inputtable time obtained by said arithmetic means in a predetermined form.

2. The code recording apparatus according to claim 1, further comprising:

time setting means for previously setting an input time of the audio information, and wherein said arithmetic means subtracts an actual input time of the audio information inputted to said apparatus from the input time set by said time setting means to obtain the inputtable time of the audio information.

3. The code recording apparatus according to claim 2, wherein said time setting means comprises means for variably setting the input time.

4. The code recording apparatus according to claim 2, wherein said arithmetic means comprises identifying means for identifying a voiced portion and an unvoiced portion of the audio information inputted by said input means, and wherein when the actual input time of the audio information inputted to said apparatus is subtracted from the input time set by said time setting means to obtain the inputtable time of the audio information, the unvoiced portion identified by said identifying means is removed from the audio information to obtain a corresponding time.

5. The code recording apparatus according to claim 4, wherein said arithmetic means further comprises dividing process means for dividing audio data corresponding to the audio information inputted by said input means at a predetermined unit, and wherein the removal of the unvoiced portion identified by said identifying means is conducted by said dividing process means at a dividing unit.

6. The code recording apparatus according to claim 1, wherein said time setting means comprises means for setting a predetermined input time which is fixed in said apparatus.

7. A code recording apparatus comprising:

input means for inputting multimedia information including at least audio information;

code generating means for converting the multimedia information inputted by said input means into optically readable code;

recording means for printing the code generated by said code generating means on a predetermined recording medium as an optically readable image;

time determining means for determining an inputtable time of the audio information to be input by said input means in accordance with a printable area of a recording medium of the code to be printed by said recording means; and display means for displaying the inputtable time determined by said time determining means in a predetermined form.

8. The code recording apparatus according to claim 7, wherein said time determining means comprises area detecting means for detecting the printable area of the code in the recording medium, and the inputtable time of the audio information is determined based on a result detected by said area detecting means.

9. The code recording apparatus according to claim 8, wherein said recording means comprises means for detecting the printable area of the code in the recording medium to print other information including at least one of a document and an image except the code on the recording medium.

10. The code recording apparatus according to claim 7, wherein said time determining means comprises area indicating means for previously enabling an operator to indicate the printable area, and the inputtable time of the audio information is determined based on the area indicated by said area indicating means.

11. The code recording apparatus according to claim 10, wherein said area indicating means comprises printable area indicating sheet reading means for reading the printable area indicating sheet having a mark for indicating a printable position of the code on the recording medium, and the printable area is indicated from the mark read by said printable area indicating sheet reading means.

12. A code recording apparatus comprising:

input means for inputting multimedia information including at least audio information;

code generating means for converting the multimedia information inputted by said input means into optically readable code; and recording means for printing the code generated by said code generating means on a predetermined recording medium as an optically readable image, and for printing other information including at least one of a document and an image except the code to meet the recording medium, and wherein an inputtable time of the audio information to be coded which is inputted by said input means is substantially brought into coincidence with a printing time of said other information.

13. The code recording apparatus according to claim 12, further comprising:

means for enabling a user to visually recognize a state of said other information during printing.

14. The code recording apparatus according to claim 12, further comprising:

means for starting input of the audio information by said input means based on a start of a printing operation of said other information.

15. The code recording apparatus according to claim 12, further comprising:

time determining means for determining the inputtable time of the audio information to be input by said input means in accordance with a printable area of a recording medium of the code to be printed by said recording means; and means for controlling a printing speed of said other information based on the inputtable time determined by said time determining means.

16. The code recording apparatus according to claim 15, further comprising:

time setting means for previously setting an input time of the audio information, and wherein said time determining means determines the inputtable time of the audio information based on the input time set by said time setting means.

17. A code recording apparatus comprising:

input means for inputting multimedia information including at least audio information;

code generating means for converting the multimedia information inputted by said input means into optically readable code;

recording means for printing the code generated by said code generating means on a predetermined recording medium as an optically readable image, and for printing other information including at least one of a document and an image except the code to meet the recording medium; and means for controlling a form of said other information to be printed on the recording medium in accordance with an area of a coding of the audio information input by said input means.

* * * * *